US 9,232,766 B1

(12) United States Patent
Strohdach, Sr. et al.

(10) Patent No.: US 9,232,766 B1
(45) Date of Patent: Jan. 12, 2016

(54) CAT TOILET SEAT AND TRAINING SYSTEM

(71) Applicants: Viktoria Veronika Strohdach, Sr., Lucerne Valley, CA (US); Norman Robert Strohdach, Lucerne Valley, CA (US)

(72) Inventors: Viktoria Veronika Strohdach, Sr., Lucerne Valley, CA (US); Norman Robert Strohdach, Lucerne Valley, CA (US)

(73) Assignee: Norman R Strohdach, Apple Valley, CA (US)

( * ) Notice: Subject to any disclaimer, the term of this patent is extended or adjusted under 35 U.S.C. 154(b) by 82 days.

(21) Appl. No.: 14/256,933

(22) Filed: Apr. 19, 2014

(51) Int. Cl.
*A01K 29/00* (2006.01)
*A01K 1/01* (2006.01)

(52) U.S. Cl.
CPC .................... *A01K 1/0121* (2013.01)

(58) Field of Classification Search
CPC .............................. A01K 1/0121; A47K 13/06
USPC ................................................. 119/162; 4/235
See application file for complete search history.

(56) References Cited

U.S. PATENT DOCUMENTS

| 54,480 | A | * | 5/1866 | Alexander | 4/235 |
| 426,287 | A | * | 4/1890 | Larkin | 4/234 |
| 3,672,331 | A | * | 6/1972 | Brody et al. | 119/162 |
| 4,461,046 | A | * | 7/1984 | Adams | 4/235 |
| 5,797,148 | A | * | 8/1998 | Kivela | 4/235 |
| 6,418,880 | B1 | * | 7/2002 | Chiu | 119/162 |
| 7,536,733 | B2 | * | 5/2009 | Berube et al. | 4/661 |
| 7,882,805 | B2 | * | 2/2011 | Yu | 119/162 |
| 7,963,251 | B2 | * | 6/2011 | Lapidge et al. | 119/162 |
| 8,051,804 | B1 | * | 11/2011 | Rescate | 119/162 |
| 2007/0017023 | A1 | * | 1/2007 | Berube et al. | 4/661 |
| 2008/0202439 | A1 | * | 8/2008 | Lapidge et al. | 119/162 |
| 2009/0211530 | A1 | * | 8/2009 | Yu | 119/162 |

* cited by examiner

*Primary Examiner* — Kristen C Hayes
(74) *Attorney, Agent, or Firm* — Bruce A. LEv

(57) ABSTRACT

A toilet seat and training system specifically designed for cats. The instant seat includes a circular sitting member having a center orifice therethrough, a wide platform formed on opposite sides thereof so a cat can be well balanced thereon, and a series of concentric annular tray members attached to an inner rim of the sitting member and formed having progressively smaller sizes, and which can be successively removed to vary the size of the center orifice, and is designed to releasably attach to an existing toilet seat and fit underneath a human toilet seat, so people can still have use of their toilet seat without interference from the cat's seat. This seat can be used in conjunction with specialized dissolving litter, a pet urine odor eliminator, and a urine detector light.

17 Claims, 8 Drawing Sheets

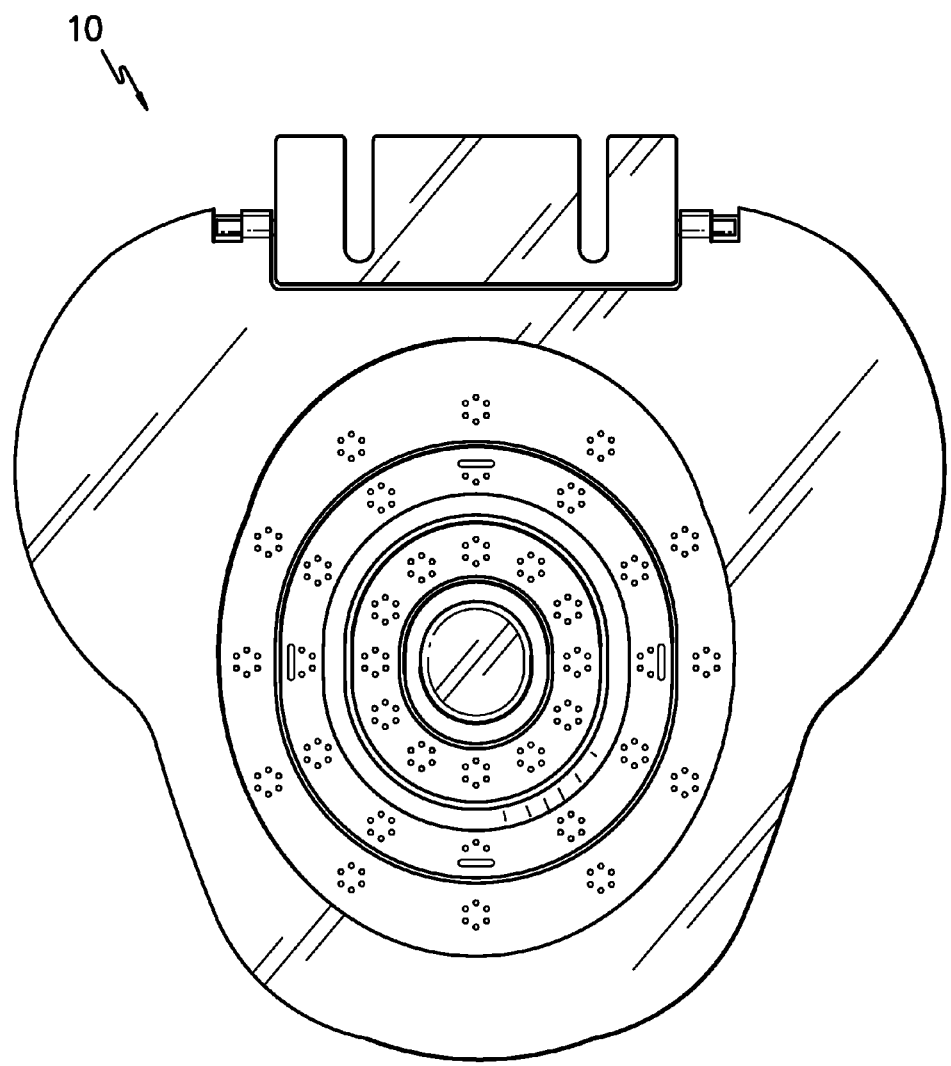
FIG. -1-

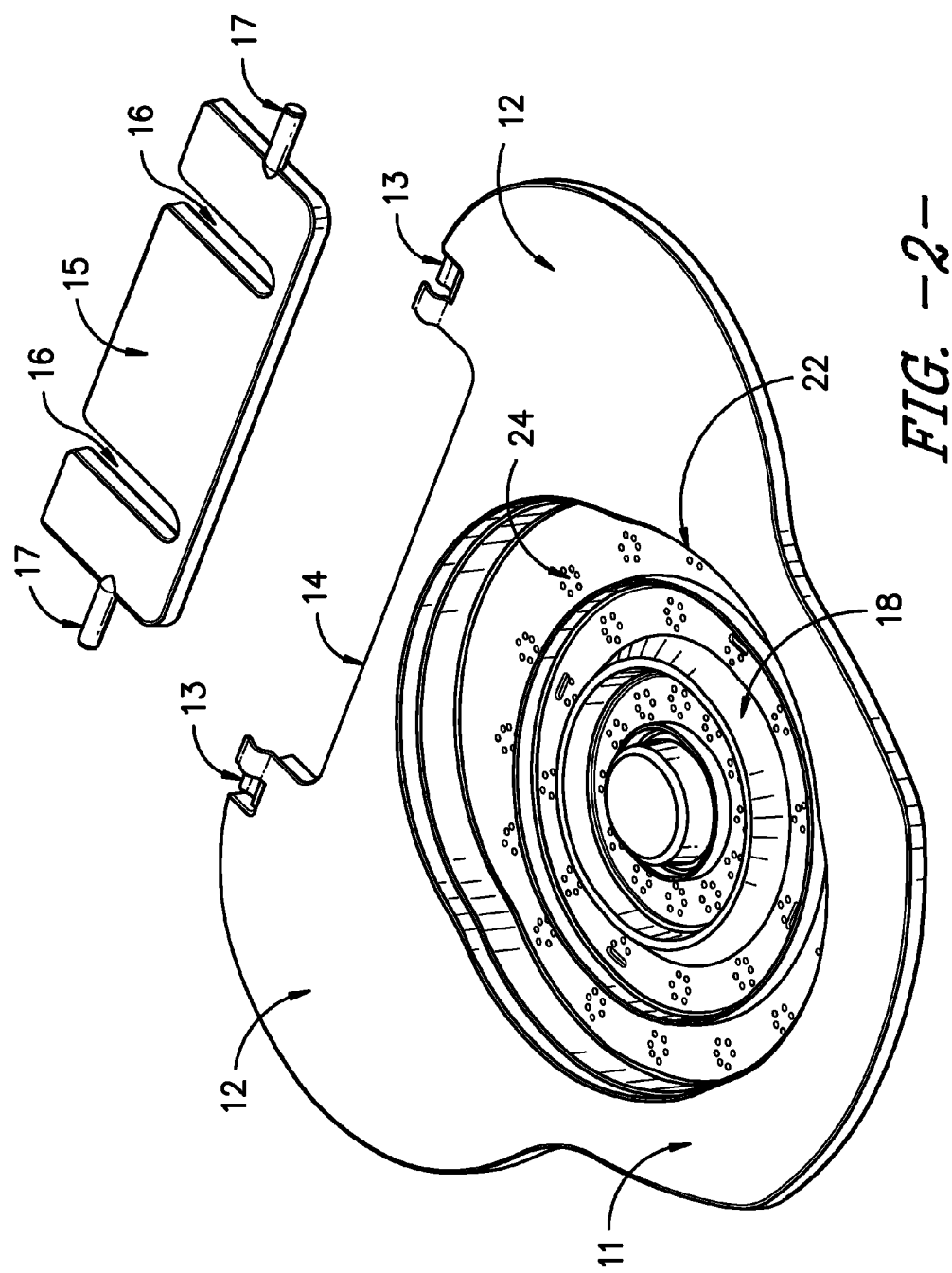

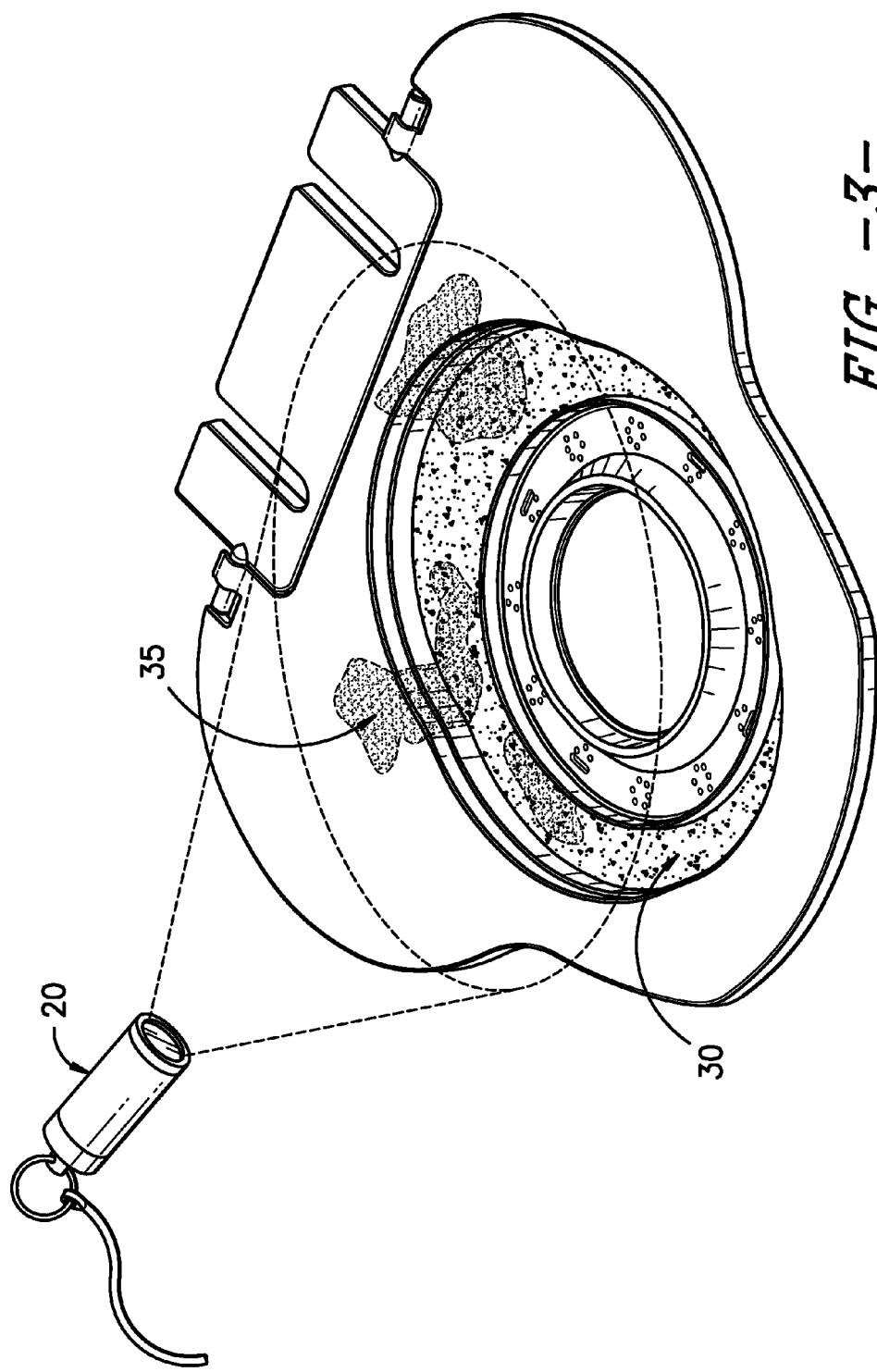
FIG. -3-

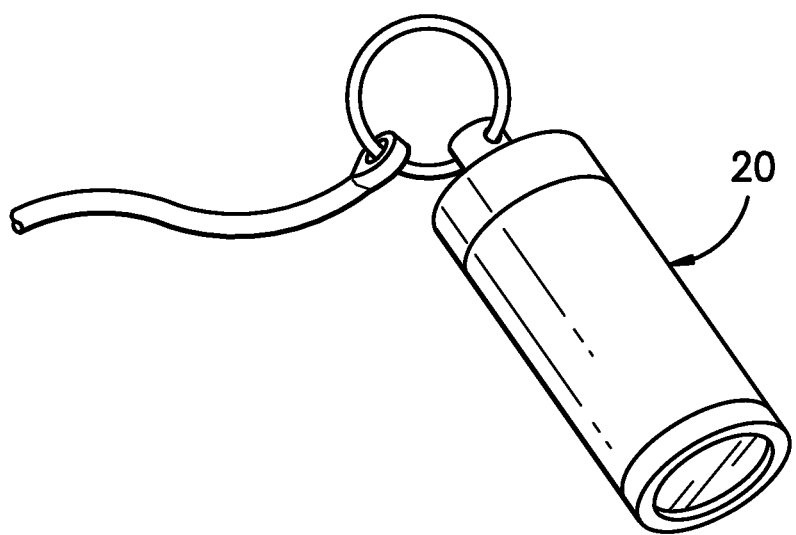
FIG. -4-

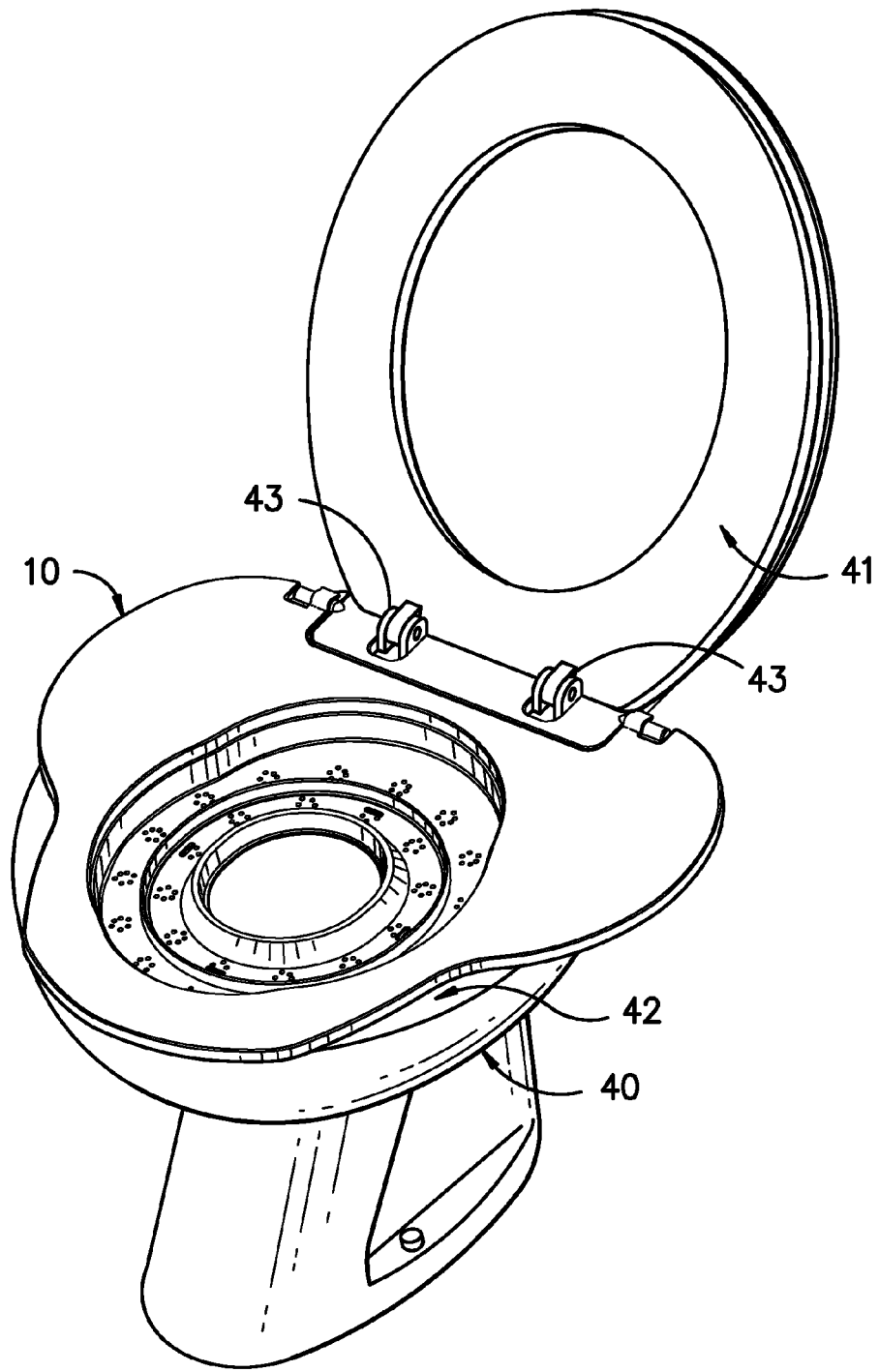
FIG. -5-

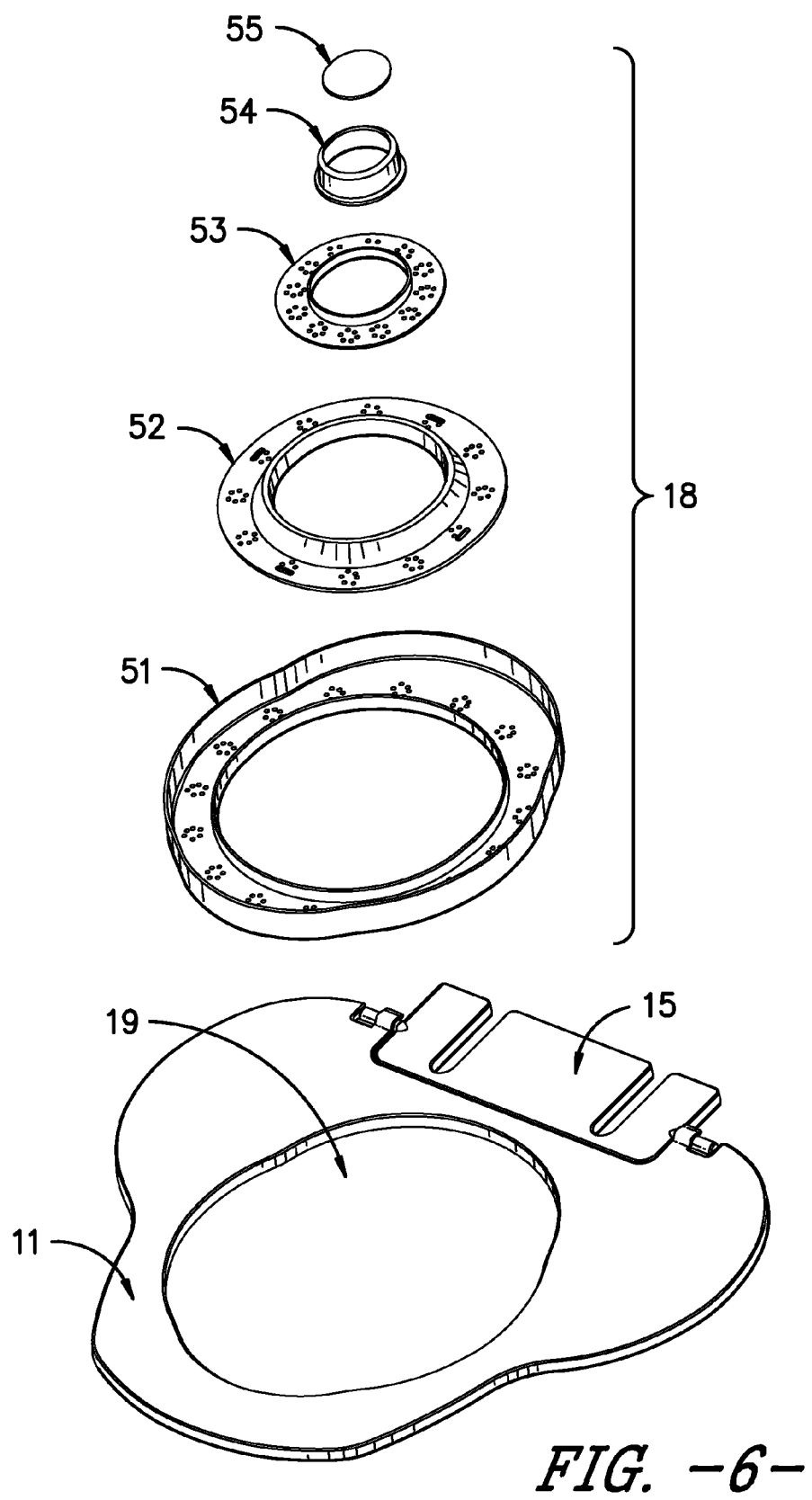
FIG. -6-

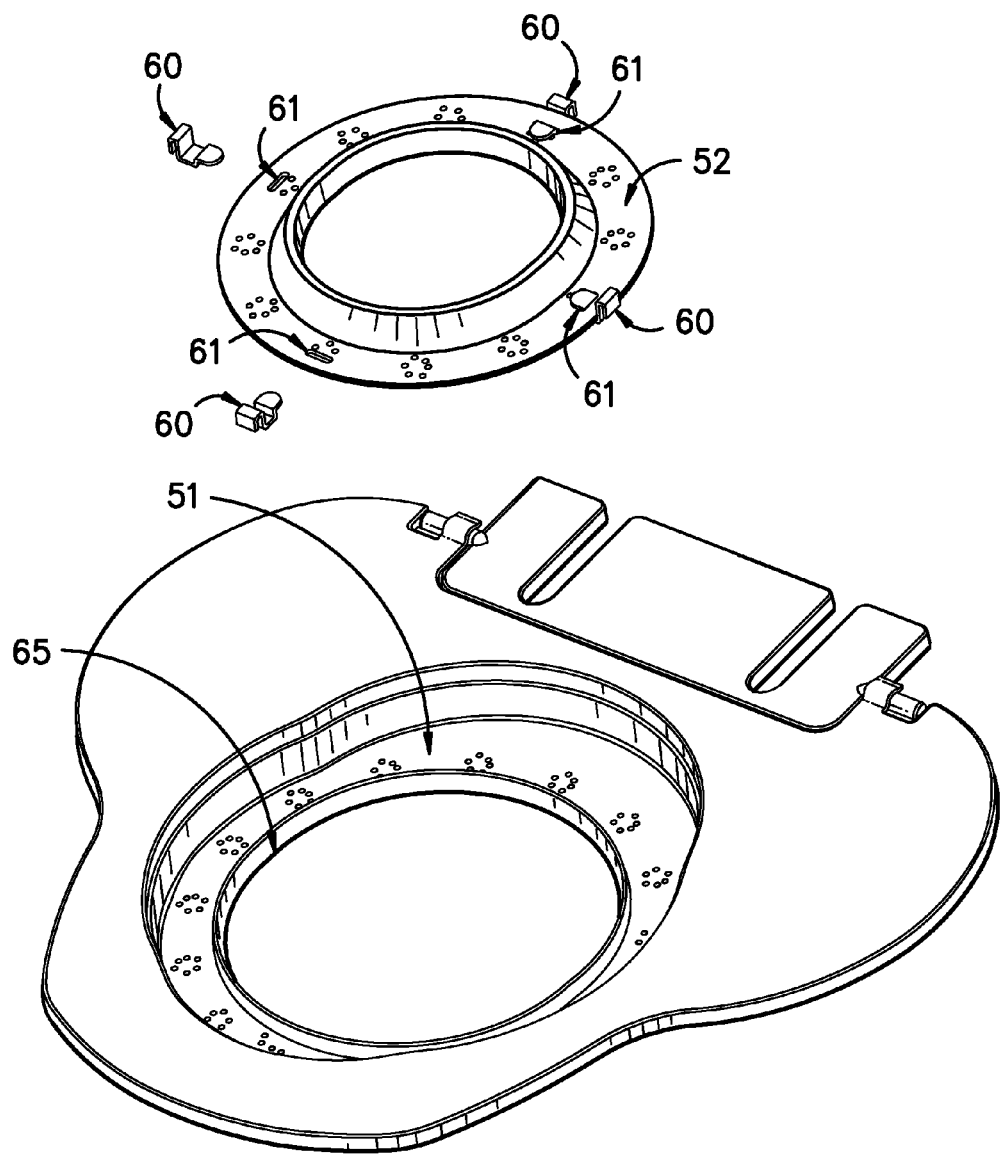
FIG. -7-

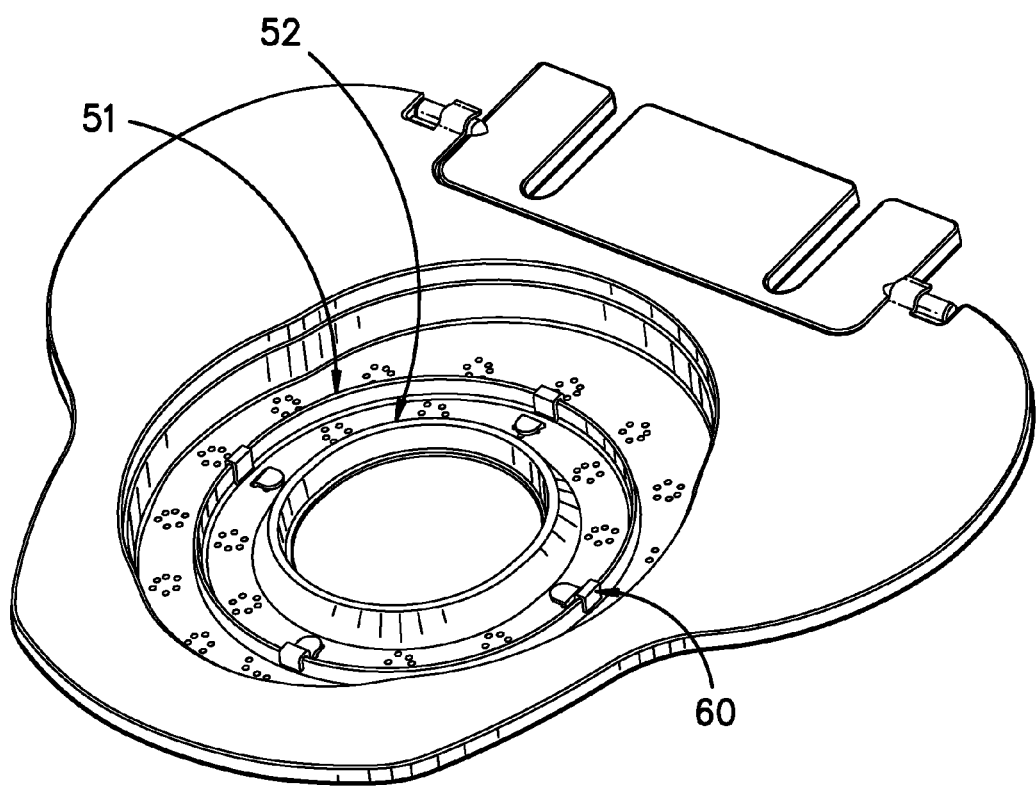
FIG. -8-

CAT TOILET SEAT AND TRAINING SYSTEM

PRIORITY

This application claims priority to Provisional Application No. 61/813,660 filed on Apr. 19, 2013.

FIELD OF THE INVENTION

This invention relates to a toilet seat and training system specifically designed for cats, and is designed to fit underneath a regular human toilet seat so people can still have use of their toilet seat without interference from the cat's toilet seat.

BACKGROUND OF THE INVENTION

As independent as cats can be, they still need our assistance with things like food, water, and comfortable living conditions, so they in turn, will enjoy being around us. There is one thing that is very unpleasant for both cats and people, a stinky litter box. This is a problem for everybody who has a cat. As strange as it may sound, this problem is something we have created ourselves when litter boxes were first introduced back in 1947.

In following, cats can become stressed because of the odor that is often left behind when people clean the litter box. This is because people usually only clean what they can see in the litter box. When a cat has no alternative but to use a dirty litter box it can cause aggressive and neurotic behavior and is the leading cause of cat homelessness.

Another concern with old style litter boxes is that the cat can get some of the litter caught in its paws and then drag it around the person's house.

Furthermore, it is a tedious job to continuously have to clean an old style litter box, and then have to dispose of the dirty litter in an environmentally friendly way. The most common cat litter is still clay-based and makes up about 80% of cat litter sold today. This is very detrimental to our environment for two reasons. Firstly, each year, over a hundred and fifty thousand acres of land is strip-mined when harvesting clay for cat litter. Soil is extracted from only the first few feet of soil, which damages vegetation and trees in the process in order to gain access to the clay. And secondly, used litter gets deposited into landfills and never decomposes. In the U.S. alone, over 9 million tons of used cat litter is deposited in landfills every year.

Therefore, there became an obvious need to offer an alternative device and system that would be healthier for cats and people, be more pleasant to be around, be easier to operate, and better for the environment.

The instant toilet seat and training system was specifically designed for cat owners to overcome the aforementioned issues, and unlike other toilet training products, never tries to force a cat to use a human toilet seat. Instead the instant seat and training system was developed with a cat's comfort in mind.

SUMMARY OF THE INVENTION

This invention essentially consists of a toilet seat and training system specifically designed for cats. The instant seat includes a circular sitting member having a center orifice therethrough, a wide platform formed on opposite sides thereof so that a cat can be well balanced thereon, and a series of concentric annular tray members attached to an inner rim of the sitting member and formed having progressively smaller sizes, and which can be successively removed to vary the size of the center orifice, and is designed to fit underneath a regular human toilet seat, so people can still have use of their toilet seat without interference from the cat's seat. This seat can be used in conjunction with specialized dissolving litter, a pet urine odor eliminator, and a urine detector light.

Previous devices and apparati that do not incorporate the novel features of the instant invention that are within the field include the following:

U.S. Pat. No. 7,963,251.

This apparatus does not include wide platforms formed on opposite sides of its seat, and therefore a cat cannot and will not be as well balanced upon the seat as the present invention, and thereby may not want to use the device. Further, this apparatus does not include the use of, or disclose in combination with, specialized dissolving litter, a pet urine odor eliminator, or a urine detector light. Furthermore, the invention of '251 is designed to fit upon an existing toilet seat member, therefore a person would need to remove the cat seat before using the toilet. In the instant invention, the cat seat is designed to be placed underneath the existing seat and upon the lower toilet bowl rim, thereby allowing a person to simply lower the existing toilet seat upon the in-place cat seat and proceed, and then raise the seat back up to allow the cat access to the in-place cat seat. And furthermore, the instant prior states that their seat is a temporary training aid to get a cat to use a human toilet and that it fits only standard toilet bowls not elongated toilet bowls as can the instant inventive cat toilet seat.

The novel features of the present invention are set forth in the claims herein. The functionality, modes of operation, purposes, and advantages of this invention can be further understood with reference to the following drawings and description of the preferred embodiment.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter which contains illustrated preferred embodiments of the invention.

BRIEF DESCRIPTION OF THE DRAWINGS

FIG. 1 is a top view of the toilet seat fully assembled.

FIG. 2 is a perspective view of the toilet seat with the connector panel member detached.

FIG. 3 is a perspective view of the toilet seat with several inner tray members removed, specialized dissolving litter within the largest tray member, and the urine detector light showing where urine is located.

FIG. 4 is a perspective view of the urine detector light.

FIG. 5 is a perspective view of the toilet seat installed upon an existing toilet.

FIG. 6 is an exploded view of the toilet seat showing the tray section separated into the individual tray members and parts.

FIG. 7 is a perspective view of one of the tray members that was removed being reattached to its adjacent tray member via clip members and slots.

FIG. 8 is a perspective view of the tray member of FIG. 7 reattached to its adjacent tray member via the clip members and slots.

DETAILED DESCRIPTION OF THE PREFERRED EMBODIMENT

The preferred embodiment of the improved cat toilet seat (10) is illustrated in FIGS. 1-6. The improved cat toilet seat includes a circular sitting member (11) having a center orifice therethrough (19), a wide platform (12) formed on opposite sides thereof so a cat can be well balanced thereon, and a tray section (18) including a series of concentric annular trays (51, 52, and 53) and a center ring (54) and center cap (55) all respectively attached to one another at respective outer rims to respective inner rims, and all thereby attached to the inner rim of the sitting member (11), and formed having progressively smaller sizes, and which can be successively removed to vary the size of the center orifice, and is designed to fit underneath a regular human toilet seat (41) and on the toilet rim (42) of a regular toilet (40), so people can still have use of their human toilet seat (41) without interference from the cat's seat (10). This seat can be used in conjunction with specialized dissolving litter (30), a pet urine odor eliminator and a urine detector light.

In FIGS. 1 and 2, the improved cat toilet seat (10) is fully assembled with its tray section (18) attached around its inner rim (22), along with connector panel member (15) in place within cut-out portion (14) via pivot pins (17) within flexible pivot pin holders (13). The connector panel member (15) is adapted to connect with an existing human toilet (40) and allow the cat toilet seat to pivot thereto. In this embodiment, tray section (18) includes three concentric tray members (51, 52, and 53) having drainage holes (24), center ring (54), and center cap (55) all respectively attached to one another from respective outer rims to respective inner rims, and all attached to the inner rim (22) of the sitting member (11).

In FIG. 2, the improved cat toilet seat (10) is shown with the connector panel member (15) detached from the pivot pin holders (13). The connector panel member (15) further includes elongated notch members (16) that are adapted to slide around and frictionally hold onto the hinge members (43) of the existing human toilet (40) that are used to pivot seat member (41) of the existing human toilet (40), as shown in FIG. 5. Elongated notch members (16) are elongated such that they can help adjust the position of the cat toilet seat upon existing toilet bowls of differing shapes and sizes. In another embodiment, hinge members (43) of the existing human toilet (40) are loosened and the connector panel member (15) slid under the hinge members such that the connector panel member notch members (16) are slid around the bolt members used to attach the hinge members to the existing toilet. Once these bolt members are tightened, the hinge members press down on the connector panel member and thereby securely connected to the existing toilet (40). As such, the rest of the cat toilet seat is removable and reattachable to the connector panel member, and thereby the existing toilet, via the pivot pins (17) and the flexible pivot pin holders (13). Therefore, the rest of the cat seat, besides the connector panel member, can be snapped on and off very easily and quickly to the connector panel member and thereby the existing toilet. Also shown in FIG. 2 are platform portions (12) that extend outwardly from opposite sides of the sitting member (11), wherein each platform portion (12) is adapted such that a cat can more easily jump upon, sit, and become balanced thereon.

In FIG. 3 the improved cat toilet seat (10) is shown with one tray (53), center ring (54), and center cap (55) removed. In this form, a cat has progressed in its training to using the seat with the help of some specialized dissolving litter (30) in the outer most tray member (51). In following, and when cleaning, urine detector light (20) is used to make sure that all the urine (35) present is detected and removed.

In FIG. 5 the improved cat toilet seat (10) is shown installed upon the rim (42) and attached to the hinges (43) of an existing toilet (40). The existing toilet's seat (41) can still function properly by pivoting downward and resting upon the cat toilet seat (10) when in use by a human, and then pivoted back up to an open position when in use for a cat to access the cat toilet seat.

In FIG. 6 the improved cat toilet seat (10) is shown in an exploded view showing the tray portion (18) separated into its individual parts (51-55). Each part can be broken from the other, such that a person can remove the inner parts in succession until the resulting center orifice is at the desired size.

FIGS. 7 and 8 show a scenario when it is desired to reattached one of the tray members that was removed to its adjacent tray member. In this case it is desired to reattach tray member (52) to tray member (51). Tray member (51) includes a raised inner rim (65), and tray member (52) includes four equally spaced slots (61). Then, clips (60) are used and are adapted to securely fit within each slot (61) and also adapted to securely hook upon the raised inner rim (65) of tray member (52), such that tray member (52) can be reattached and thereby replaced within the center orifice to reduce the size thereof.

The following is the "Cats of Thrones" (C.O.T.) preferred "Training System" for the use of the instant improved cat toilet seat specifically designed for cats:

1. When to Begin and Preparation for Training:

Your cat should be old enough to jump up to your lap, about the same height as a toilet (about 3 months old). Prepare yourself for training also, this means realizing its going to take time for your cat to be trained. You must have patience and compassion with your cat. A good idea (if there is no one at home during the day) is to start the training on a weekend or holiday. This way, you will have plenty of time to watch your cat reaction to each stage of the training process. Also, when you plan to advance to the next stage, only do so when there is someone at home for a couple of days to see how your cat responds to the change. This might slow down your training but you will have better results and a lot less "accidents". Remember, toilet training your cat is a commitment that you will need to make to yourself and patience is the key to success.

2. Preparation for Training:

Place your existing litter box in a bathroom (if its not already there) where you're going to have the training. That way, your cat will get used to seeing their litter box in a new place. Make sure that before you introduce your cat to the C.O.T.™ system their box has been next to the toilet for at least a few days. If your cats litter box was in another room then SLOWLEY (over a few days or even weeks) bring the litter box into the bathroom. You may need to move the box only 5 to 10 feet a day before getting it into the toilet. Patience is the key, you know your cat better than anyone so you will be the judge when it come to how long this step takes.

BE SURE TO THROW AWAY YOUR CAT'S OLD LITTER BOX! If you just put the old box into a closet or garage you are setting yourself up for failure. First of all your cat will most likely be able to smell their old box thereby confusing your cat greatly. Second, you are telling yourself that you "really are not committed" to seeing the training through to the end. For those of you with children (if you don't have children ask someone who does) remember how long it took for your child to be potty trained? I think it's safe to say that it took more than a few weeks. That is NOT saying that your cat won't be trained in a few weeks, it CAN happen, just be prepared that in most cases it will take longer. Some cats will move through stages in days and others will take weeks or even months on a particular stage of the system. Patience, cleanliness, and rewards (cat treats) are probably the most important areas when training with the C.O.T.™ Toilet Training.

Before setting up the C.O.T.™ toilet seat for cats, put gloves on, and thoroughly clean under the human seat. Even if you normally clean your toilet very well you might be surprised just how dirty underneath the seat, by the bolts it can be. Clean all the areas that you are aware (and areas you think) of where your cat has made its business on. The best way to find old urine and feces stains is with the "C.O.T.™ Urine Detector Light", and for best results use the C.O.T.™ Urine Detector Light at night with all your house lights off, this will allow for better detection of stains. Also, make sure to use "C.O.T.™ Pet Odor and Stain Eliminator" to eliminate any residual odor. It is environmentally friendly (100% plant based) most other products on the market are loaded with chemicals which can have the opposite effect in trying to eliminate odors that your cat might be sensitive to.

Set up the C.O.T.™ seat on a toilet. You should not have to remove the human seat; simply loosen up the bolts on the human seat to slip the C.O.T.™ clip into the bolts under the human seat.

Place the C.O.T.™ Dissolving Cat Litter inside the tray, and sprinkle some litter from your cat's old litter box on top of C.O.T.™ Dissolving Cat Litter, so your cat will sense the familiar smell. Prepare treats (Like Kitty Kaviar) for your cat for every successful toilet experience your cat achieves.

Always make sure to keep the human seat and its top up and discontinue using any toilet bowl cleaner. This is because the strong smell of the cleaner can affect your cat's willingness to use the toilet. You should only use C.O.T.™ Pet Odor and Stain Eliminator, it is safe, non-toxic (100% plant based) and does a fantastic job of cleaning.

We also recommend that you put your toilet paper roll in a high place, out of reach of your cat.

While most cats won't have a problem moving from their litter box to "Stage 1" of the C.O.T.™ seat which begins on top of the toilet, some cats might. If you experience any stress in your cat when you introduce them to "Stage 1" then we recommend you begin with "Stage 1" on the floor. You do this simply by replacing your old litter box with "Stage 1" of C.O.T.™. You will also need 2 additional items to successfully move through this phase. First being absorbent Pads: C.O.T.™ Toilet Seat for Cats has drainage holes and because of it you will need to place absorbent pads under the C.O.T.™ Seat. We recommend (of course) using C.O.T.™ Urine Pads. Our pads are super absorbent, fight odor and best of all are less expensive than any other absorbent pads we have found at stores. And, the second being to fill the C.O.T.™ Seat with C.O.T.™ Dissolving Cat Litter and sprinkle some of your cat's old litter on top of the C.O.T.™ Dissolving Cat Litter. Place your cat on the seat, and let him walk around to get accustomed to it. Stay a couple of days (or weeks) on this stage and once your cat is using the C.O.T.™ Toilet Seat regularly, proceed to the next step.

Something to "balance" the sides of the C.O.T.™ Seat. More specifically, the wide platforms need something underneath to keep the seat from tipping over when your cat steps onto it. Old phone books work well, or anything that will fit underneath the platform will work. Make sure whatever you use is odorless, it might sound strange to say that but your cat is very sensitive to smells. You can always spray whatever you use with C.O.T.™ Pet Odor and Stain Eliminator just to be safe.

It is important to note that in every instance when you introduce a new movement or stage in the training process that you give your cats loads of praise, encouragement and treats.

3. Training:

When your cat is ready, after moving from their old litter box to the toilet or from the C.O.T.™ Toilet Seat on the floor then to the toilet, Install the C.O.T.™ Toilet Seat. The C.O.T.™ Toilet Seat is designed with drain holes for cleaning convenience (it lets the water and urine go right through the holes down to the toilet). After your cat has urinated, rinse only the spot where you notice is stained with hot water until the stain is gone. It is good to use a directional sprayer to more accurately pin-point the exact area to rinse thereby not dissolving all the crystals at once.

Next, after rinsing, take one or two paper towels (you can also use cloth towels because when you are drying the crystals you are drying clean crystals) and dry off the remaining crystals. Don't worry about drying them off completely, just enough to get any standing water should be enough because the crystals will dry quickly by themselves. After using towel, spray (one or two squirts) of the remaining crystals with C.O.T.™ Pet Odor and Stain Eliminator and fill the seat again with C.O.T.™ Dissolving Cat Litter. Repeat this stage for a week or longer.

Always leave the bathroom door and the lid open, and make sure the human toilet seat is up. Your cat should only use their own toilet seat (C.O.T.™ Seat) to avoid falling in the toilet.

Introduction to Water.

Once your cat is completely comfortable using the first stage of the system, cut the first middle circle out using a cutting device such as a knife or box-cutter, or you may be able to punch it out by hand, just be careful if you do it by hand as the edges can be sharp. Next, fill the tray with C.O.T.™ Dissolving Cat Litter. Then put your cat on the seat, and let him get used to seeing the water in the toilet. This is a good time for lots of praise and attention along with a treat.

Stay for 1-1.5 weeks in this stage or until your cat is using the seat with no problems. If your cat is comfortable with this stage, move on to the next stage. If your cat appears nervous or uneasy with the water in the toilet, then stay with the 1st stage of the system until your cat is comfortable.

For each stage thereafter ($3^{rd}$, $4^{th}$, $5^{th}$, and $6^{th}$) Stages cut the circles accordingly. As you progress through the stages, you will be decreasing the amount of dissolving litter in each stage, this is done so your cat gets used to seeing less and less litter.

Going back from Stage 5 to Stage 4. We have designed the C.O.T.™ Seat to allow to go back from Stage 5 to Stage 4. This is because after years of testing we have found that this is the only stage where we witnessed some cats becoming nervous or slowing in their progression of training. By allowing cats to go back from Stage 5 to Stage 4 it will allow the cat more time getting used to the larger opening.

To go back to Stage 4, use the C.O.T.™ clips (included in system) to reattach Stage 4 to the seat.

Training Multiple Cats:

If you have more than one cat, you can toilet train them together. If your cats share the same litter box, then you just introduce the seat to both of them. It is common with cats that one will be an alpha who is the leader, other cats will usually follow them. When you see one cat going into use the toilet, do your best to bring other cats around to watch to see what is going on. Be careful not to be too pushy as this can have the opposite affect of encouraging them to use the toilet. If your cats are not sharing the same litter box then focus on one cat first, then after one has mastered the toilet move on to the next one. Remember that the main reason cats often times need separate boxes is because of the odor of the other cat. Once they discover that by using the toilet there is no odor left behind by either the other cat or themselves they will transition to the toilet much easier. The main point to be aware of here is odor, more-so being odorless! By using C.O.T.™ Pet Odor and Stain Eliminator each and every time when cleaning you increase your chances of being done with training faster.

Our C.O.T.™ Pet Odor and Stain Eliminator C.O.T.™ is formulated from a unique blend of 100% natural and environmentally friendly ingredients to provide a powerful deodorizing action. It was specially developed to attack and destroy many unpleasant odors from pet accidents, chemicals, and spills. As an added benefit, it will also help dissolve grease, slime and other waste deposits to provide a cleansing action.

To Unleash the Deodorizing Power of C.O.T.™ Pet Odor and Stain Eliminator, simply spray C.O.T.™ in the air, in and around toilet bowl and smell the difference. It eliminates floor smell without masking with scents, helps dissolve grease, slime & waste deposits, it has no carcinogens, phosphates or harmful chemicals, is biodegradable, non-toxic, safe & eco-friendly, it is not tested on any animals, it works on hardwood, tiles, concrete, linoleum & more.

Our C.O.T.™ Dissolving Cat Litter wipes out 95% of urine (ammonia) when it contacts C.O.T.™ Crystals then, fecal matter is simply discarded into toilet. Just apply hot water to C.O.T.™ Crystals to dissolve and re-activate remaining crystals. There is no clumping and or scooping. C.O.T.™ is a 100% natural Dissolving Cat Litter. Don't put C.O.T.™ into traditional litter boxes. When used together with the C.O.T.™ Training System (C.O.T.™ Oder Eliminator and C.O.T.™ Urine finder) you will have the cleanest healthiest cat/human home.

C.O.T.™ Is made with 100% natural ingredients (no silica dust for you or cat to breathe). We don't harvest 100's of thousands of acres to produce C.O.T.™ like clay litter brands do, or get dumped as 9 plus million tons each year into landfills.

C.O.T.™ Is safe for all toilets including septic systems, C.O.T.™, will not harm marine animal life, and will never clog pipes.

C.O.T.™ Is odorless. The #1 reason that cats are returned to shelters is because of litter box issues. These issues are most often because cats are sensitive to oders. So the best way to cure this issue is to have a odorless litter. Even better yet, is to become litter free which is ultimate goal with the C.O.T.™ Toilet Training System.

C.O.T.™ Urine Light Detector includes a UV-light that detects new and old pet/human urine. Its small size allows you to carry it anywhere you go, it's very easy to use, and presents very clear pictures of urine. Considering the fact that thousands of cats are abused because of litter box problems (people do not clean properly), the C.O.T.™ Urine Light Detector can be very helpful in toilet training, by helping find and eliminate the urine stains. It is recommended to use in total darkness.

C.O.T.™ Absorbent Pads. Begin by re-placing your existing litter box with the C.O.T.™ Toilet Seat and put the pad directly under the C.O.T.™ Seat. You may be able to use the pad twice (or three times) by folding it in half since urine will only pass through the drain holes within the seat. If you do use the pad more than once be sure to spray the pad once soiled with C.O.T.™ Oder Eliminator to assure proper training procedures are followed.

Place your cat (kitten) onto the C.O.T.™ Seat to familiarize themselves with their new litter box. Always reward them after a successful elimination experience. Cats that are already litter boxed trained will usually accept the new box without and hesitation, kittens sometimes take a little longer just be patient they will get it. Because of the extended platforms on the seat it may be necessary that while the seat is on the ground that you place some books (or anything to support the sides) under the platforms to keep the seat from leaning over and making the cat nervous.

Once the cat has become comfortable with using the C.O.T.™ Seat then you can begin the transition to the toilet. Some cats will require this to be done slowly in stages (by placing large books or blocks under the seat to slowly raise the height to that of the toilet) however, many cats will accept moving the seat directly from the floor to the toilet in one step. Each cat is different so you will have to watch to see how yours reacts to this transition.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. An improved cat toilet seat comprising a circular sitting member having an inner rim and a center orifice therethrough; platform portions formed on and extending outwardly from opposite sides of said sitting member, wherein each said platform portion is adapted such that a cat can more easily and comfortably jump upon, sit, and become balanced thereon; a tray portion attached to said inner rim of said sitting member and including a series of concentric annular tray members formed having progressively smaller sizes, wherein said tray members can be successively detached from one another and removed in succession from the smallest to the largest tray member in order to vary the size of said center orifice; a connector panel member pivotally connected to a back portion of said sitting member and adapted to removably attach to an existing toilet member; and wherein said sitting member is formed having a cross-section that is adapted to allow said cat toilet seat to lay stably upon a rim of said existing toilet member and be removably and pivotally attached to said existing toilet member underneath a toilet seat of said toilet member without interfering with the required movements of said toilet seat.

2. The improved cat toilet seat of claim 1, wherein said tray members are connected successively to one another, such that an outer rim of each adjacent smaller tray member is attached to an inner rim of an adjacent larger tray member.

3. The improved cat toilet seat of claim 2, wherein adjacent tray members are connected to one another by a breakable plastic material, such that the connection between chosen tray members can be broken and tray members removed to form a desired size of said center orifice.

4. The improved cat toilet seat of claim 1, wherein said circular sitting member further comprises a pair of flexible pivot pin holders on a back side thereof; and wherein said connector panel member is formed having pivot pin members extending from opposite sides thereof that are adapted to be removably held by said flexible pivot pin holders, such that said circular sitting member can be easily removed and reattached to said connector panel member; and wherein said connector panel member further includes a pair of elongated notch members that are adapted to slide upon or under hinge members of said existing toilet member, to thereby securely hold said connector panel member thereto and allow the rest of the cat toilet seat to be easily snapped on and off therefrom.

5. The improved cat toilet seat of claim 1, further comprising kitty litter within at least one said tray member, such that any discarded material from a cat that does not pass through said center orifice can be captured and neutralized by said at least one said tray member and said kitty litter and adapted to be manually removed therefrom.

6. The improved cat toilet seat of claim 5, wherein said kitty litter is specialized dissolving litter formed from materials including evaporated sodium chloride.

7. The improved cat toilet seat of claim 1, further comprising a urine odor eliminator placed within a chosen tray member.

8. The improved cat toilet seat of claim 1, further comprising a urine detector light adapted to aid in identifying the presence of urine in or around said cat toilet seat to thereby aid in cleaning said cat toilet seat and its surroundings.

9. The improved cat toilet seat of claim 1, wherein at least one said tray members is formed with a plurality of drain holes therethrough adapted to allow cat urine to pass therethrough and into said existing toilet member.

10. The improved cat toilet seat of claim 1, wherein the largest tray member includes a raised inner rim, and the second largest tray member includes four equally spaced slots; and wherein clips are used and are adapted to securely fit within each said slot and adapted to securely hook upon said raised inner rim of said largest tray member, such that said second largest tray member can be reattached to said largest tray member and thereby replaced within said center orifice to reduce the size thereof.

11. A bathroom accessory kit for cats comprising:
   a.) An improved cat toilet seat comprising a circular sitting member having an inner rim and a center orifice therethrough; platform portions formed on and extending outwardly from opposite sides of said sitting member, wherein each said platform portion is adapted such that a cat can more easily and comfortably jump upon, sit, and become balanced thereon; a tray portion attached to said inner rim of said sitting member and including a series of concentric annular tray members formed having progressively smaller sizes, wherein said tray members can be successively detached from one another and removed in succession from the smallest to the largest tray member in order to vary the size of said center orifice; a connector panel member pivotally connected to a back portion of said sitting member and adapted to removably attach to an existing toilet member; and wherein said sitting member is formed having a cross-section that is adapted to allow said cat toilet seat to lay stably upon a rim of said existing toilet member and be removably and pivotally attached to said existing toilet member underneath a toilet seat of said toilet member without interfering with the required movements of said toilet seat;
   b.) kitty litter within at least one said tray member, such that any discarded material from a cat that does not pass through said center orifice can be captured and neutralized by said at least one said tray member and said kitty litter and adapted to be manually removed therefrom;
   c.) a urine odor eliminator placed within a chosen tray member; and;
   d.) a urine detector light adapted to aid in identifying the presence of urine in or around said cat toilet seat, to thereby aid in cleaning said cat toilet seat and its surroundings.

12. The bathroom accessory kit for cats of claim 11, wherein said tray members are connected successively to one another, such that an outer rim of each adjacent smaller tray member is attached to an inner rim of an adjacent larger tray member.

13. The bathroom accessory kit for cats of claim 12, wherein said trays are connected to one another by a breakable plastic material, such that the connection between a chosen number of smaller trays can be broken and the trays removed to form the desired size of said center orifice.

14. The bathroom accessory kit for cats of claim 11, wherein said circular sitting member further comprises a pair of flexible pivot pin holders on a back side thereof; and wherein said connector panel member is formed having pivot pin members extending from opposite sides thereof that are adapted to be removably held by said flexible pivot pin holders, such that said circular sitting member can be easily removed and reattached to said connector panel member; and wherein said connector panel member further includes a pair of elongated notch members that are adapted to slide upon or under hinge members of said existing toilet member, to thereby securely hold said connector panel member thereto and allow the rest of the cat toilet seat to be easily snapped on and off therefrom.

15. The bathroom accessory kit for cats of claim 11, wherein said kitty litter is specialized dissolving litter formed from materials including evaporated sodium chloride.

16. The bathroom accessory kit for cats of claim 11, wherein at least one said tray members is formed with a plurality of drain holes therethrough adapted to allow cat urine to pass therethrough and into said existing toilet member.

17. The bathroom accessory kit of claim 11, wherein the largest tray member includes a raised inner rim, and the second largest tray member includes four equally spaced slots; and wherein clips are used and are adapted to securely fit within each said slot and adapted to securely hook upon said raised inner rim of said largest tray member, such that said second largest tray member can be reattached to said largest tray member and thereby replaced within said center orifice to reduce the size thereof.

\* \* \* \* \*